Feb. 28, 1950 W. E. HUNT 2,499,314
TWO-BLADED TAIL ROTOR ON COMMON HINGE
Filed Sept. 12, 1947 2 Sheets-Sheet 1

WILLIAM E. HUNT
INVENTOR

BY Charles L. Shelton
ATTORNEY

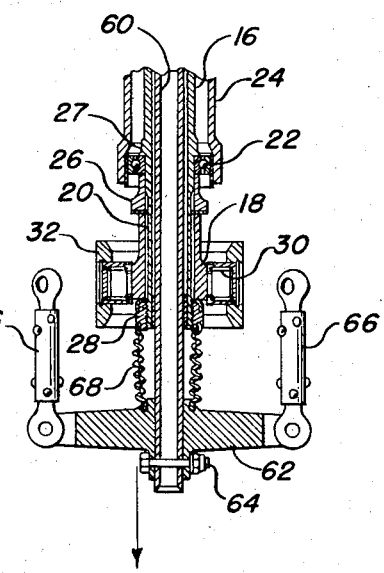
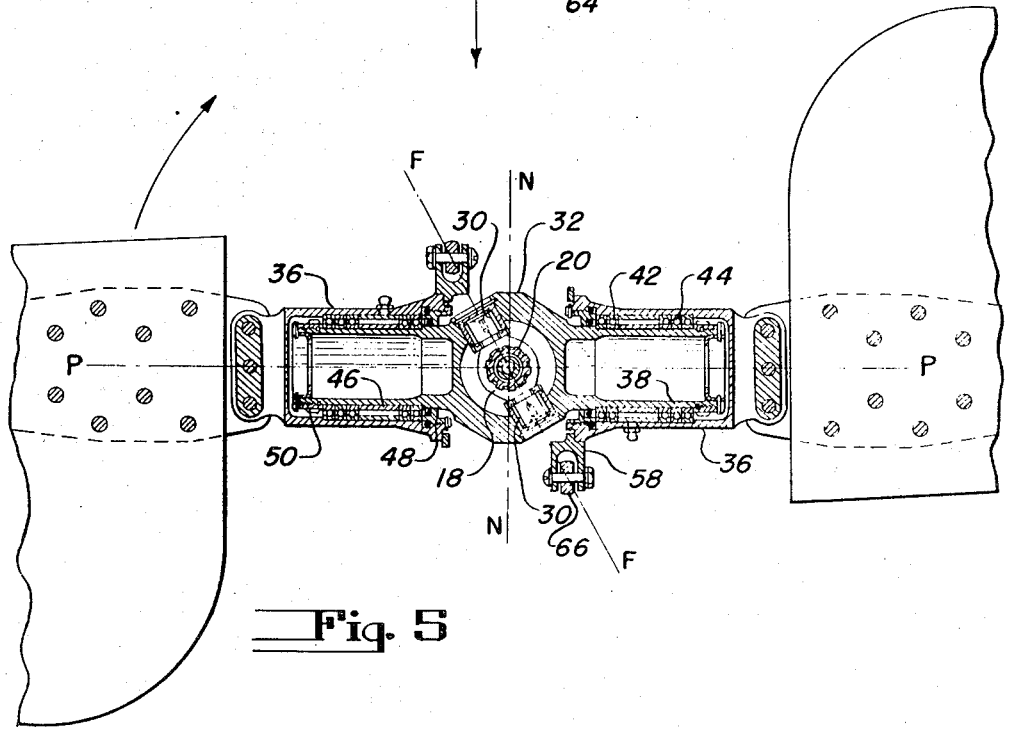

Patented Feb. 28, 1950

2,499,314

UNITED STATES PATENT OFFICE 2,499,314

TWO-BLADED TAIL ROTOR ON COMMON HINGE

William E. Hunt, Brooklyn, Conn., assignor to United Aircraft Corporation, East Hartford, Conn., a corporation of Delaware Application September 12, 1947, Serial No. 773,721

2 Claims. (Cl. 170—160.46)

This invention relates to helicopter rotors and more particularly to an improved torque counteracting tail rotor which will greatly reduce the fuselage vibrations originating in the tail rotor.

Accordingly, an object of this invention is to provide a two bladed tail rotor having an inclined flapping hinge to reduce vibrations due to coriolis forces and excessive flapping.

A further object is to provide a simplified rotor assembly having an inclined flapping hinge for allowing some degree of blade movement in the plane of rotation to thereby reduce vibrations due to coriolis forces.

Another object is to provide a two bladed tail rotor having a flapping hinge which is inclined with respect to the pitch-changing axis of the blades so that the pitch will be varied as the blades flap to reduce the degree of flapping.

A further object is to provide a simple, lightweight, rugged tail rotor which may be manufactured easily.

Other objects and advantages will be apparent from the specification and claims, and from the accompanying drawings which illustrate the preferred embodiment of the invention.

In the drawings:

Fig. 4 is a sectional view taken along line 4—4 of Fig. 3; and

Fig. 5 is a sectional view taken along line 5—5 of Fig. 2.

Figure 1:
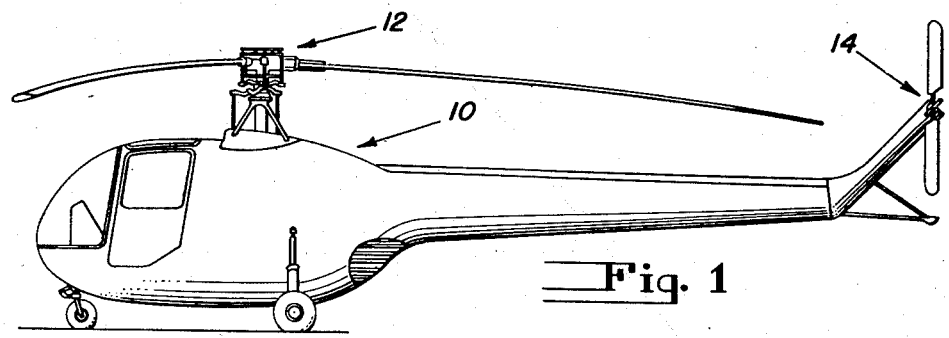
Fig. 1 shows a helicopter having a tail rotor constructed according to this invention.
Figure 2:
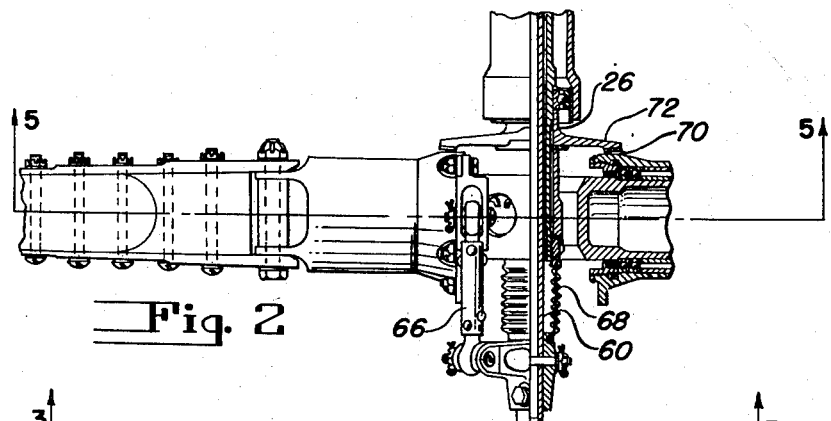
Fig. 2 shows a half-section side view of the tail rotor taken along line 2—2 of Fig. 3.

Fig. 1 shows a helicopter 10 of conventional configuration having a single sustaining rotor 12 and a torque counteracting rotor 14. An engine, not shown, drives the main rotor 12 through a centrifugal overrunning clutch and the pitch of the blades on the main rotor 12 may be varied cumulatively and cyclicly by means of suitable well-known controls. The tail rotor 14 is driven through a power take-off which is located on the delivery side of the clutch so the main and tail rotors are interconnected and will freely rotate in the event of an engine failure.

The tail rotors heretofore used have employed three blades mounted radially on a hub and having flapping axes perpendicular to the radial line. In forward flight, and during sharp manoeuvres, the blades are subjected to various aerodynamic forces which produce blade movement about the flapping hinges. Since the blades were not free to move in a path of rotation due to lack of drag hinges, they were subjected to great accelerations and decelerations caused by the flapping action, resulting in vibrations which were transmitted through the helicopter structure. It is the purpose of my invention to provide a rotor assembly which will provide movement in the plane of rotation as well as in the flapping sense to reduce the amplitude of the vibrations originating in the blades and transmitted through the rest of the helicopter structure.

Referring now to Figs. 2–5 which show the details of the tail rotor assembly, a hollow drive shaft 16 turns trunnion 18 through splines 20 and is supported in housing 24 by ball bearings 22. The blade stop member 26 is splined on shaft 16 between the bearings 22 and trunnion 18, and the entire assembly is held in place against shoulder 27 by lock nut 28 on the end of shaft 16. Hub 32 is mounted on trunnion 18 by means of needle bearings 30 which form a flapping hinge having an axis F—F. Each of the pair of blades 34, 34 is bolted on a sleeve 36 which is mounted on axle arm 38 by means of bearings 42, 44, spaced by member 46, and are held in the assembled position by means of lock nuts 48, 50. As shown, the hub 32 and axle arms 38 are integral but it should be understood that any other suitable construction may be used. The bearings 42, 44 are sealed from dust by means of gaskets 54, 56 and may be lubricated through oil fitting 52.

The pitch of the blades 34, 34 is controlled by movement of rod 60 which is actuated by conventional controls and is co-axial with, and inside of, the hollow drive shaft 16. Pitch-changing beam 62 is rigidly connected to control rod 60 by means of through bolt 64 and each end of the beam is connected through a link 66 to pitch control horns 58, 58, each of which is secured to a sleeve 36 by bolts 59. To seal the interior of the rotor hub assembly, a flexible boot 68 extends between lock nut 28 and the inner end of beam 62. When the control rod 60 is moved outwardly, the beam 62 will also move outwardly to rotate the sleeves 36 and blades 34 about pitch-changing axis P—P in a pitch-increasing direction; and when the rod 60 is moved inwardly, the pitch of the blades 34, 34 will be decreased.

Figure 3:
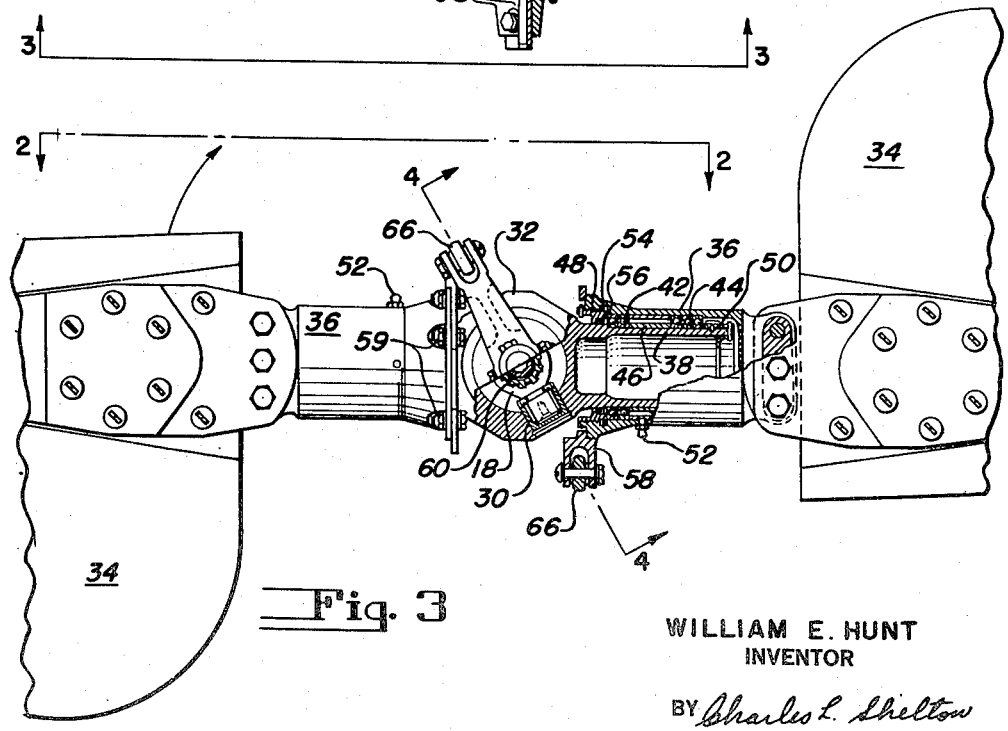
Fig. 3 is a plan view, with parts broken away, taken along line 3—3 of Fig. 2.

As may be seen most clearly in Figs. 3 and 5, the connections between control links 66 and pitch control horns 58 lie on the flapping hinge axis F—F. Thus, as the blades flap about axis F—F, there will be no movement of the points of connection to the control horns and therefore the sleeves 36 will not be rotated to increase or decrease the pitch. The pitch will be varied, however, due to the Delta-3 angle provided by the inclination of pitch-changing axis F—F with respect to the normal flapping axis P—P. The angle of inclination shown equals 30° which has been found to give the best operating characteristics and tends to maintain the blades rotating in their normal path by decreasing the lift of the blade which has flapped upwardly and increasing the pitch of the blade which, of necessity, must simultaneously flap downwardly. If it is desired to change the operating characteristics the point of connection of link 66 and control horn 58 may be moved off axis F—F in the proper direction to give the desired new characteristics. Should the flapping angle be excessive, the sleeve 36 will strike rubber face 70 on arm 72 of the blade stop member 26 and thus prevent any possible blade contact with the tail assembly of the helicopter.

If the flapping axis were normal to the pitch-changing axis P—P, as shown by the line N—N, there would be no freedom of blade movement in the path of rotation since there is no drag hinge. Thus, as the blade flapped, the action would have to be about the line N—N, causing rapid accelerations and decelerations which would exert large forces on the rotor assembly. When the flapping axis is inclined with respect to the pitch-changing axis P—P in the manner shown there will be some degree of movement in the path of rotation and the accelerations and decelerations to which the blade is subjected will be materially reduced, thus reducing the consequent vibrations. For example, as the left hand blade 34 (Figs. 3 and 5) flaps upwardly there will be upward movement due to the flapping, forward movement in the direction of rotation at the normal rotational speed, and there will be additional forward movement due to the inclination of the flapping hinge F—F. Under these conditions the blade speed in its path is more nearly constant. It should be noted that, as the left hand blade flaps upwardly and forwardly, the right hand blade will flap downwardly and forwardly in the path of rotation. Therefore, each blade moves forwardly when moving from its normal path due to the flapping action and then smoothly decelerates to normal speed when returning to the normal path so that the forces exerted on the rotor are held to a minimum without resorting to drag hinges and the associated complicated structures.

This rotor assembly, therefore, provides some degree of freedom of movement in the path of rotation and also provides a virtual Delta-3 action to reduce the degree of flapping. These highly desirable operating characteristics are further enhanced by the fact that the structure is simpler to fabricate than those heretofore used.

I claim:

1. In a rotor assembly, in combination, a tubular drive shaft, a hub mounted on the outboard end of said drive shaft, two diametrically opposed rotor blades mounted on said hub for pitch changing movement about their longitudinal axis, a biased pivot for supporting said hub on said shaft disposed at an oblique angle to the longitudinal axis of said blades, a manually reciprocable control rod extending through said drive shaft, a transverse member carried by said control rod and disposed parallel to the axis of said pivot outboard of said blades, pitch control horns on the root portions of said blades terminating substantially in the axis of said pivot, and parallel links connecting the opposite ends of said transverse member with the extremities of said horns.

2. A torque compensating tail rotor for a helicopter comprising a tubular, laterally extended shaft, a hub mounted on the extended end of said shaft for movement about a pivot having its axis transverse to said shaft, two oppositely disposed rotor blades rigidly mounted on said hub for flapping movements about said pivot having root portions mounted for pitch changing movement about the longitudinal axis of said blades, the longitudinal axis of said blades being disposed at an oblique angle to the axis of said pivot, whereby upward flapping of a blade results in forward movement of said blade in the path of blade rotation, a manually reciprocable blade pitch control rod extended axially through said shaft, a transverse member carried by said rod at the outboard end of said shaft and disposed parallel with the axis of said pivot, horns oppositely extending from the root portions of said blades and terminating substantially in the axis of said pivot, and link means connecting the extremity of each of said horns with an extremity of said transverse member.

WILLIAM E. HUNT.

REFERENCES CITED

The following references are of record in the file of this patent:

UNITED STATES PATENTS

| Number | Name | Date |
|---|---|---|
| 1,980,169 | Cierva | Nov. 13, 1934 |
| 2,088,413 | Hafner | July 27, 1937 |
| 2,242,457 | Cierva | May 20, 1941 |
| 2,368,698 | Young | Feb. 6, 1945 |
| 2,369,048 | Hays | Feb. 6, 1945 |
| 2,382,460 | Young | Aug. 14, 1945 |
| 2,421,364 | Cierva | May 27, 1947 |
| 2,430,767 | Hirsch | Nov. 11, 1947 |

FOREIGN PATENTS

| Number | Country | Date |
|---|---|---|
| 476,596 | Great Britain | Dec. 13, 1937 |